UNITED STATES PATENT OFFICE.

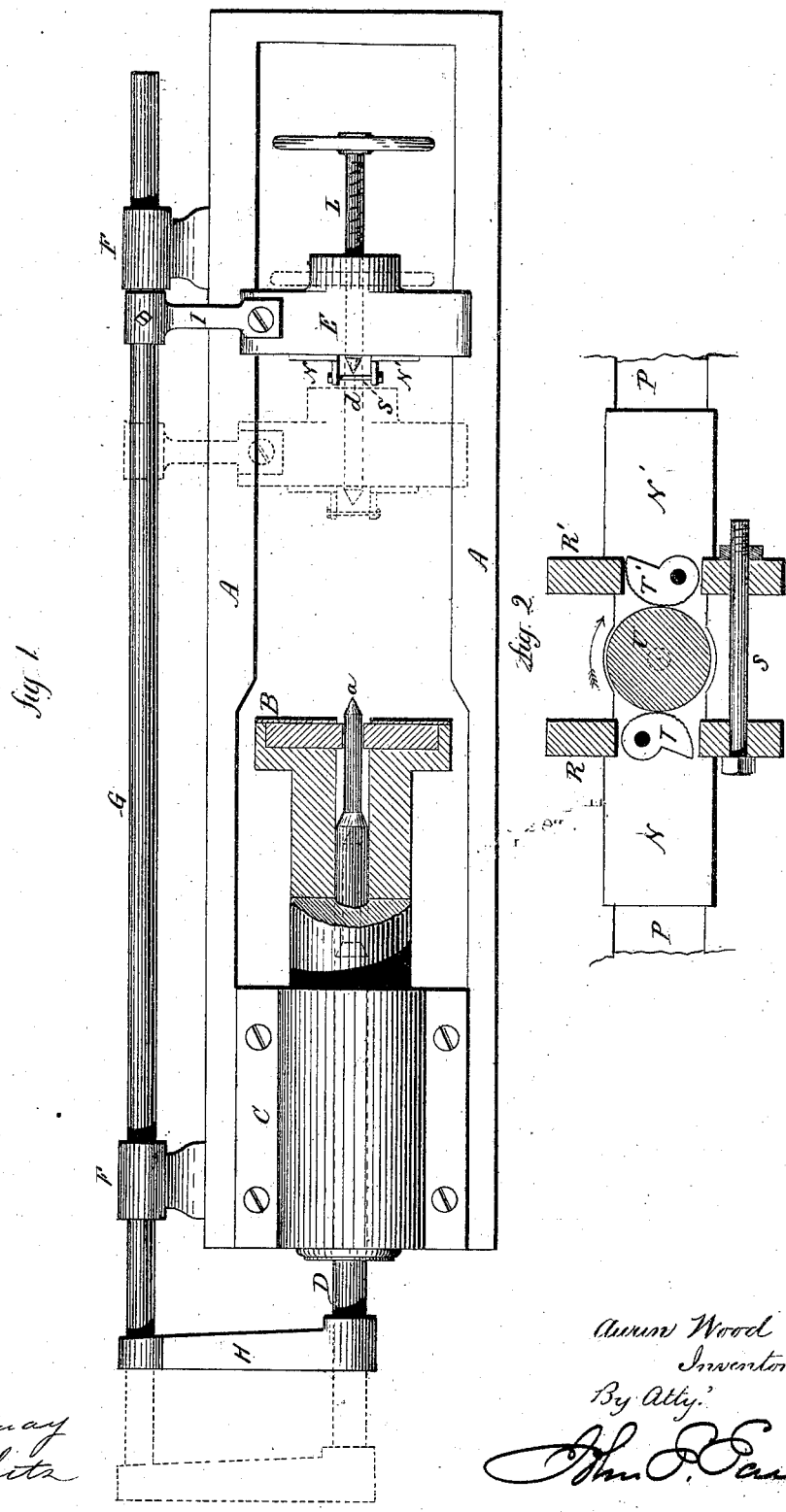

AURIN WOOD, OF WORCESTER, MASSACHUSETTS.

IMPROVEMENT IN BOLT-THREADING MACHINES.

Specification forming part of Letters Patent No. 147,462, dated February 10, 1874; application filed October 24, 1873.

*To all whom it may concern:*

Be it known that I, AURIN WOOD, of Worcester, in the county of Worcester and State of Massachusetts, have invented a new Improvement in Bolt-Cutting Machine; and I do hereby declare the following, when taken in connection with the accompanying drawings and the letters of reference marked thereon, to be a full, clear, and exact description of the same, and which said drawings constitute part of this specification, and represent in—

Figure 1 a top view, portions broken away to illustrate the invention; Fig. 2, a detached view, enlarged.

This invention relates to an improvement in machine for cutting bolts, with special reference to the machine for which Letters Patent were granted to me July 7, 1868, but alike applicable to other constructions of bolt-cutting machines.

In bolt-threading machines as usually constructed, the bolt or blank has been held by one end only while cutting the thread, but as such holding does not insure a certain relative line of cut to the head, it has been necessary, in making bolts where a square or turned under surface of the head is necessary, as in fine machine work, that such class of bolts should be threaded in screw-cutting lathes, in which the bolt may be held on the same centers as when the head is "squared," thus making this class of bolts very expensive and uncertain as to diameter, as it is nearly impossible to thread any number of bolts in a screw-cutting lathe of exactly the same diameter.

The object of this invention is to adapt bolt-threading machines to the threading of "squared" or "faced" headed bolts, such as above mentioned; and the invention consists, first, in the arrangement of a mandrel through the screw-cutting head, and so as to be supported thereby, the said mandrel provided with a center within the screw-cutting head, and arranged to move longitudinally through the said head, and connected with the holding-carriage, which is provided with a corresponding adjustable center, so that as the carriage approaches the cutting-dies the center within the dies will retreat accordingly, and the bolt to be threaded secured between these centers by a holding device on the said carriage, and in that condition run into the dies, or the dies onto the bolt, as the case may be; second, in combining with the screw-cutting die-holder and the blank-holder, having an adjustable center, a pair of adjustable slides on the blank-holder, movable radially from the said center, each of the said slides provided with a cam, between which the blank-bolt will be grasped.

A is the bed upon which the mechanism is arranged; B, the die-holder carrying the dies for threading the bolt, in the usual manner for bolt-threading machines. The head is supported in a bearing, C, and made to revolve by the usual means applied in bolt-cutting machines. Longitudinally through this head a mandrel, D, is arranged, and so as to move freely back and forth within the head. E is the carriage which holds the bolt to be threaded, and slides freely to and from the cutting-head B, moved so to do by any of the known mechanisms applied in similar machines. Parallel to the axis of the head B a bar, G, is arranged to move longitudinally in suitable bearings or supports F. This bar is connected to the mandrel D by an arm, H, and also to the carriage E by the arm I, hence, as the carriage E moves toward the head B the mandrel D will be correspondingly moved or drawn into the head, or vice versa. The mandrel D is provided with a center or point, $a$, which is the actual center of revolution of the head B. A corresponding center, $d$, is arranged in the carriage E, these two centers being in axial line with the cutting-dies of the head B. The center $d$ is made adjustable by means of a screw, L.

The bolt to be threaded is first centered in the usual manner for centering bolts to be turned or cut in a screw-cutting lathe, and is then placed on the centers $a$ $d$, and there secured so as to be run into the dies, guided only by the longitudinal movement of the movable center $a$ and the holder E, therefore, the head of the bolt being squared upon the same centers upon which the thread is cut insures the proper fitting of the head on the surface upon which it is designed to bear, and which can only be insured when the head is squared upon the same centers upon which it is threaded, and by combining the moving centers $a$ $d$ with the cutting-dies the same perfection of threading is attained as in bolt-threading machines—that is, all bolts threaded by the same dies will be of the same diameter.

In some classes of bolt-threading machines the bolt itself is turned while the dies remain stationary; in others, the cutting-dies revolve while the bolt remains stationary; but, in carrying out my invention in all machines, one thing is essential—that is to say, the centers $a$ $d$ should be in axial line with the bolt-threading dies, the said centers forming the centers of revolution, and the blank-holder, with its center $d$ and the center $a$, to move in said axial line. For different lengths of bolts the arm in connection with the carriage E, is disengaged from the bar G, and the carriage moved to the desired relative position, and there again connected to the bar G.

The same device may be used for turning and squaring bolts, it only being necessary to substitute the proper cutting-dies for the thread-cutting dies. I therefore wish to be understood by the expression "bolt-threading" as including other than thread-cutting dies.

To prevent the bolt from turning, I arrange in the forward end of the carriage a pair of slides, N N′, each moving toward and from the center in a suitable guide, P, in the end of the carriage. These slides have each a transverse flange, R R′, projecting from the slide, and the two are joined by a bolt, S, the bolt admitting of the adjustment of the two slides to a greater or less distance from each other. In each of the flanges is arranged a cam, T T′, the one T hung above the center and the other below, the axis of the cam directed at right angles to the path of movement of the respective slides, the face of the cams preferably roughened or serrated. Between the two cams the bolt U is arranged upon the centers, the two slides adjusted relatively to the diameter of the bolt, so that the faces of the cams will bear against the bolt.

The cutting device turns in the direction denoted by the arrow, hence the tendency to turn the bolt is in that direction. This turning of the bolt, or tendency so to do, causes a corresponding turning of the cams by contact with the bolt, until the bolt has so far turned the cams that the resistance of the cams is greater than the cutting power; then the bolt will be rigidly held. This construction, therefore, makes a self-adjusting holder or dog for the bolts, the bolt S being only used for adjustment of considerable difference of diameters.

I am aware that two corresponding centers have been combined with a cutting device, so that the two centers served the double purpose of supporting and feeding the thing to be wrought, the same being found in English patent to Charles Iles, No. 480, 1855, and I do not wish to be understood as claiming any of the parts except as in the combination hereafter specified.

I claim as my invention—

1. In combination with the screw-cutting die-holder B and the carriage or head E, provided with a device for holding the bolt, the two centers $a$ $d$, the one passing through and supported by the said screw-cutting die-holder, but so as to move longitudinally independent of said die-holder, the other adjustably-arranged in the said head, the said head and center $a$ connected by a bar, G, all substantially as and for the purpose specified.

2. In combination with the blank-holder E and its adjustable center $d$ and screw-cutting die-holder B, the slides N N′, provided, respectively, with cams T T′, substantially as and for the purpose specified.

AURIN WOOD.

Witnesses:
J. H. SHUMWAY,
A. J. TIBBITS.